US012399721B2

United States Patent
Edgar et al.

(10) Patent No.: US 12,399,721 B2
(45) Date of Patent: Aug. 26, 2025

(54) DEBUG IN SYSTEM ON A CHIP WITH SECURELY PARTITIONED MEMORY SPACE

(71) Applicant: SiFive, Inc., San Mateo, CA (US)

(72) Inventors: Ernest L. Edgar, Colorado Springs, CO (US); Yann Loisel, La Ciotat (FR)

(73) Assignee: SiFive, Inc., Santa Clara, CA (US)

( * ) Notice: Subject to any disclaimer, the term of this patent is extended or adjusted under 35 U.S.C. 154(b) by 17 days.

(21) Appl. No.: 18/577,677

(22) PCT Filed: Jun. 3, 2022

(86) PCT No.: PCT/US2022/032177
§ 371 (c)(1),
(2) Date: Jan. 8, 2024

(87) PCT Pub. No.: WO2023/283004
PCT Pub. Date: Jan. 12, 2023

(65) Prior Publication Data
US 2024/0338221 A1   Oct. 10, 2024

Related U.S. Application Data

(60) Provisional application No. 63/220,436, filed on Jul. 9, 2021.

(51) Int. Cl.
*G06F 9/38* (2018.01)
*G06F 9/4401* (2018.01)
(Continued)

(52) U.S. Cl.
CPC .......... *G06F 9/3861* (2013.01); *G06F 9/4403* (2013.01)

(58) Field of Classification Search
CPC .... G06F 12/1441; G06F 9/3861; G06F 21/57; G06F 21/53; G06F 12/0292; G06F 21/74;
(Continued)

(56) References Cited

U.S. PATENT DOCUMENTS

2014/0250540 A1* 9/2014 Balasubramanian ... G06F 21/44
726/29
2014/0359788 A1* 12/2014 Laine ...................... G06F 21/14
726/27

(Continued)

OTHER PUBLICATIONS

Latest Trends in Hardware Security and Privacy; Giorgio Di Natale et al; Nov. 17, 2020; 5 pages.
(Continued)

*Primary Examiner* — Chun Kuan Lee
(74) *Attorney, Agent, or Firm* — Kilpatrick Townsend & Stockton LLP

(57) ABSTRACT

Systems and methods are disclosed for debug in a system on a chip with a securely partitioned memory space. For example, an integrated circuit (e.g., a processor) for executing instructions includes a processor core configured to execute instructions, including a data store configured to store a first world identifier; an outer memory system configured to store instructions and data; a data store configured to store a debug world list that specifies which world identifiers supported by the integrated circuit are authorized for debugging; and a debug enable circuitry configured to generate a debug enable signal based on the first world identifier and the debug world list, wherein the processor core is configured to jump to debug handler instructions in response to a debug exception or ignore the debug exception depending on the debug enable signal.

20 Claims, 8 Drawing Sheets

(51) Int. Cl.
  *G06F 11/362* (2025.01)
  *G06F 12/02* (2006.01)
  *G06F 12/1027* (2016.01)
  *G06F 12/14* (2006.01)
  *G06F 21/53* (2013.01)
  *G06F 21/57* (2013.01)
  *G06F 21/74* (2013.01)

(58) Field of Classification Search
  CPC .............. G06F 12/1491; G06F 11/3648; G06F 9/4403; G06F 2212/1052; G06F 12/1027; G06F 12/0284
  USPC ........................................................ 712/227
  See application file for complete search history.

(56) References Cited

U.S. PATENT DOCUMENTS

2018/0048470 A1* 2/2018 Bower, III ............ H04L 9/3271
2021/0192085 A1* 6/2021 Shah ................... G06F 11/3648

OTHER PUBLICATIONS

Hector-V: A Heterogeneous CPU Architecture for a Secure RISC-V Execution Environment; Pascal Nasahl et al; Mar. 9, 2021; 13 pages.
Raven: A Novel Kernel Debugging Tool on RISC-V; Hongyi Lu et al; Jul. 2022; 6 pages.
International Search Report for international application No. PCT/US2022/032177 filed Jun. 3, 2022; Mailed Oct. 4, 2022; 15 pages.

* cited by examiner

DEBUG IN SYSTEM ON A CHIP WITH SECURELY PARTITIONED MEMORY SPACE

CROSS-REFERENCE TO RELATED APPLICATIONS

This application is a 371 of International Application No. PCT/US2022/032177, filed on Jun. 3, 2022, which claims the benefit of U.S. Provisional Application 63/220,436 filed on Jul. 9, 2021. The entire contents of these applications are incorporated herein by reference in their entirety.

TECHNICAL FIELD

This disclosure relates to debug in a system on a chip with a securely partitioned memory space.

BACKGROUND

Software isolation is an important feature mandated by distinct concerns. Considering the trend of increasing code size, the different origins of the code and the ways they are combined, important risks exist that one part can impact another one, intentionally or not.

If there is a bug and the disturbance is not on purpose, there is a concern about safety: a health-oriented device (e.g., a medical device, a car brake, a nuclear plant sensor) shall maintain its capacity for its main mission, even another piece of software running on the device has bugs and goes into infinite loop or erratic behavior.

If there is a weakness and the disturbance is on purpose, there is a concern about security: a credential-oriented device (payment terminal, badge control system, DRM-equipped device) shall resist or raise a flag, and not compromise any asset it protects. It is advantageous to develop solutions that guarantee that the failure of one piece of software does not impact the correct and full functioning of other pieces, running on the same platform.

Beyond that, it is advantageous to guarantee that an aggressive or uncontrolled piece of software cannot impact a resource belonging to another piece of software running on the same platform. Impacting any resource can have a broad meaning, from simply reading a portion of memory to modifying this portion of memory or preventing from using a peripheral. Security requirements may be more demanding than safety requirements as the latter usually lead to solutions where the application code is able to change its own privilege mode while the former usually requires that the application code cannot change its privilege mode. Thus, safety schemes, usually based on regular real-time OS, often cannot comply with security requirements while the opposite is true.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
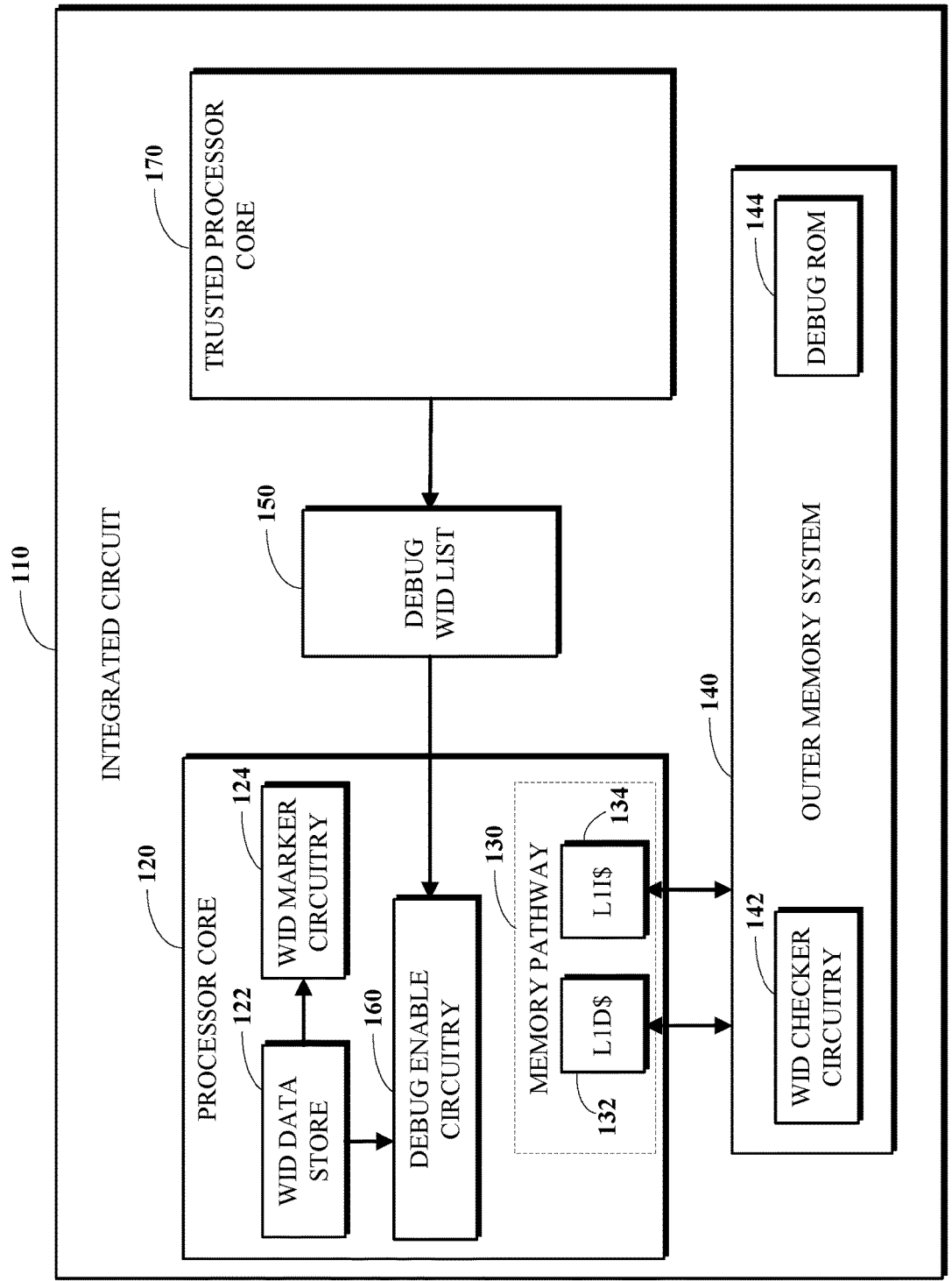
FIG. 1 is a block diagram of an example of an integrated circuit for debugging software in a system on a chip with a securely partitioned memory space.

A hardware-enforced multi-domain solution, such as SiFive WorldGuard, provides protection against illegal accesses to memories/peripherals from software applications and/or other masters. This solution aims to provide hardware means that guarantee strict and strong isolation between distinct software applications running on the same platform (e.g., single or multi-core) accessing shared resources (e.g., memories or peripherals) (see, e.g., "SiFive WorldGuard High-Level Specification").

A hardware-enforced multi-domain solution is applicable to a wide variety processors and software architectures. This solution proposes to create "worlds" that gather applications running on cores and other masters' resources like DMA channels and subordinate resources like memories or peripherals. The possible number of worlds is hardware configurable, depending on the number of cores and masters, on memories' configurations, and on the software architecture. This solution does not replace the physical memory protection (PMP) mechanism (applicable to one single core for the memories) but extends it to a multi-core, multi-software system with other masters.

The principle is to gather masters, memory areas and peripherals within sets of resources, named worlds. The worlds are distinct from each other, which means the software running on cores belonging to a world 1 cannot access resources (e.g., memory portions and peripherals) belonging to a world 2 and more generally cannot interfere with the other worlds. Of course, for inter-world communications, some memory portions can belong to more than one world, behaving as shared memory. So, one unique world identifier value is assigned to a world, and within this world, each of the masters belonging to the world is assigned the same world identifier value. This allocation is usually done for each master, the granularity level being the whole master. But a finer granularity can even be provided if the master design can support it. That is the case for cores, named WorldGuard-aware cores. On these cores, the world distinction can now also depend on the privileged mode, having distinct world identifiers based on the privilege mode (e.g., M-mode, S-mode, U-mode) on the same core. (See, e.g., "RISC-V Privileged Specification").

In some implementations, debug is selectively enabled for these worlds using a debug world list. For example, when a world identifier (WID) cannot be debugged, the debug interrupt and exceptions are not taken. In some implementations, when a debug interrupt is taken on a specific hart/core, the core jumps to an address (e.g., 0x800) in the debug ROM, in debug mode. At this stage, after some initialization, the debug ROM code can execute Abstract-Commands. The check mechanism is based on the use of the dcsr.prv, either directly (for the CSR access) or indirectly (for the data access). So, the debug ROM code: (for CSRs) performs regular access to the CSR addresses against dcsr.prv and allows access only to that privilege, except for authorized CSRs; and (for memory) performs regular addresses requests with the core WID value based on the dcsr.prv register (instead of mstatus.prv). Therefore, accesses are granted if and only if the WID world has access to the requested address.

Note: as the RISC-V debug specification allows that "A debugger can change this value to change the hart's privilege level when exiting Debug Mode", the debugger may not be able to change the dcsr.prv. As for the secure authenticated debug scheme, this WorldGuard-enforced debug process may rely on firmware execution. Therefore, the robustness of this code, especially the portions where the is checked, should be addressed if fault attacks are considered.

For example, a first technique is to consider that the debug is authorized if and only if there is a debug interrupt/exception and the current WID value authorizes the debug, based on the current WID value and the debug-wid-list list.

A second technique is to focus on the way the debug ROM code accesses to access-controlled resources, the CSRs and the resources; while the debug ROM code (the one executed during debugging operations) runs in debug mode (e.g., the highest privileged mode), it does not use these privileges for the accesses and uses the privileged mode and WID value used by the debugged software. For example, the access control may be granted with the dcsr.prv and not the mstatus.prv, which means the access control is performed based on the rules applicable for the debugged software privilege mode and WID value, not the rules of the debugging software. This second technique may simplify a lot the check of the accesses as it reuses the WorldGuard mechanisms and principles. So, the debug ROM code may be small and the approach may be consistent with the other WorldGuard mechanisms.

For example, WorldGuard is a software isolation hardware-based solution for processor cores. It applies to physical addresses. In the rest of the document, wg might be used to denote WorldGuard.

WorldGuard is a hardware-enforced multi-domain solution that provides protection against illegal memories/peripherals accesses from software applications and/or other masters, like DMAs. It aims to provide hardware means that guarantee strict and strong isolation between distinct software applications running on the same platform (single or multi-core) accessing shared resources (memories, peripherals).

This solution is applicable to any SiFive product for any software architecture and it does not require any modification to the RISC-V ISA.

This solution proposes to create "worlds" that gather applications running on cores and other masters like DMA channels and resources like memories or peripherals. A world defines permissions on physical addresses in the system, can overlap, and does not affect software-visible cache coherence. Software isolation is achieved by restricting a world's access to specific physical addresses that would be bound to different components in a system. A world in a WorldGuard-enabled system or chip will be identified by a world identifier or WID.

The possible number of worlds is hardware-configurable at elaboration stage and should be determined by the number of cores and masters, the memories' configurations, and mostly the software architecture.

As used herein, the terms "circuit" and "circuitry" refer to an arrangement of electronic components (e.g., transistors, resistors, capacitors, and/or inductors) that is structured to implement one or more functions. For example, a circuit may include one or more transistors interconnected to form logic gates that collectively implement a logical function.

As used herein, the term "data store" refers to circuitry configured to store data, such as, for example, one or more registers, random access memory, flash memory, or one or more flip-flops.

Details

FIG. 1 is a block diagram of an example of an integrated circuit 110 for debugging software in a system on a chip with a securely partitioned memory space. The integrated circuit 110 includes a processor core 120 configured to execute instructions, including a data store 122 configured to store one or more world identifiers. The integrated circuit 110 includes an outer memory system 140 configured to store instructions and data. The processor core 120 is configured to tag memory requests transmitted on a bus of the integrated circuit 110 by the processor core 120 with the first world identifier to confirm authorization to access a portion of memory space addressed by the memory requests. The integrated circuit 110 includes a data store 150 configured to store a debug world list that specifies which world identifiers supported by the integrated circuit 110 are authorized for debugging. The integrated circuit 110 includes a debug enable circuitry 160 configured to generate a debug enable signal based on the first world identifier and the debug world list, wherein the processor core 120 is configured to jump to debug handler instructions in response to a debug exception or ignore the debug exception depending on the debug enable signal. For example, the integrated circuit 110 may be used to implement the technique 700 of FIG. 7. For example, the integrated circuit 110 may be used to implement the technique 800 of FIG. 8.

The integrated circuit 110 includes a processor core 120 configured to execute instructions, including a data store 122 (e.g., one or more registers) configured to store a first world identifier. For example, multiple world identifiers that are respectively used by processes executed by the processor core 120 in different privilege modes may be stored in the data store 122. In some implementations, a first world identifier is one of multiple world identifiers stored in the processor core 120 that are each associated with different privilege modes (e.g., machine mode, supervisor mode, and user mode). For example, the integrated circuit 110 may implement a SiFive WorldGuard process-driven scheme. In some implementations, a world identifier (e.g., a first world identifier) is associated with all processes executed by the processor core 120 (e.g., regardless of their privilege modes). For example, the integrated circuit 110 may implement a SiFive WorldGuard core-driven scheme. In some implementations, the data store 122 includes a register storing a world identifier that has a width of n bits with the number of worlds supported by the integrated circuit 110 being 2n=(number of masters+2). This register may be used to mark transactions going out of the master. The data store 122 may be memory mapped to enable the trusted core 170 to write to the data store 122 to assign one or more world identifiers to one or more masters of the processor core 120.

In some implementations (not shown in FIG. 1), the data store 122 may be positioned outside of the processor core 120. For example, the data store 122 may be accessed by the processor core 120 via outside wires extending out of the processor core 120.

The processor core 120 includes a world identifier marker circuitry 124. The world identifier marker circuitry 124 may be configured to tag memory requests transmitted by the processor core on a bus of the integrated circuit 110 with a world identifier to confirm authorization to access a portion of memory space addressed by the memory requests. For example, in the TileLink bus protocol, the userField field may be used to transmit the world identifier value with the request. For example, the world identifier marker circuitry 124 may include logic to select a world identifier associated with a privilege mode of a current process running on the processor core 120 to tag an access request for a resource (e.g., memory or a peripheral).

In some implementations, a first world identifier (stored by the data store 122) is associated with a debugged process running on the processor core 120 that is being debugged, and the processor core 120 (e.g., using the world identifier marker circuitry 124) is configured to use the first world identifier to tag request on a bus generated by debug handler instructions (e.g., stored in the debug ROM 144) that access resources in a memory space when the debug handler instructions are executed responsive to a debug exception caused by the debugged process. For example, the debug handler instructions may be executed using a privilege mode associated with the debugged process. In some implementations, the privilege mode used by the debugged process is determined by checking privilege level bits in a debug control and status register when the debug handler instructions are executed responsive to a debug exception caused by the debugged process. For example, the privilege mode and the world identifier to use with debug handler instructions may be determined as described in relation to FIGS. 5 and 6.

The processor core 120 includes a memory pathway 130 that enables the processor core 120 to access instructions and data stored in the outer memory system 140. In this example, the memory pathway 130 includes an L1 data cache 132 and an L1 instruction cache 134 and associated memory management logic to increase the efficiency of memory operations acting on the outer memory system 140. In some implementations, the processor core 120 uses physical addresses. In some implementations, the processor core 120 uses virtual addresses and the memory pathway 130 may include one or more translation lookaside buffers (TLBs). The processor core 120 may use the memory pathway 130 to load instructions and data from the outer memory system 140. The processor core 120 may use the memory pathway 130 to store data in the outer memory system 140.

The integrated circuit 110 includes an outer memory system 140 configured to store instructions and data. The outer memory system 140 may include one or more memories. The outer memory system 140 may include one or more layers of cache. The outer memory system 140 may include memory mapped ports to one or more peripherals. The processor core 120 may be configured to (e.g., using the world identifier marker circuitry 124 and the data store 122 storing the one or more world identifiers) tag memory requests transmitted on a bus of the integrated circuit 110 by the processor core 120 with a world identifier (e.g., the first world identifier) to confirm authorization to access a portion of memory space addressed by the memory requests.

The outer memory system 140 includes world identifier checker circuitry 142 for resources (e.g., portions of memory or peripherals). For example, the world identifier checker circuitry 142 for a resource may be configured to check a world identifier that has been used to tag a request on a bus for that resource against a stored world identifier or set of world identifiers for that resource. For example, a world identifier or set of world identifiers for a resource (e.g., a portion of memory or a peripheral) may be stored by the world identifier checker circuitry 142 and may be set by the trusted core 170. For example, the world identifier checker circuitry 142 may include a WorldGuard filter. For example, the world identifier checker circuitry 142 may include a WorldGuard PMP.

The outer memory system 140 includes a debug read only memory (ROM) that stores debug handler instructions that can be accessed and executed in response to a debug interrupt/exception raised by a debug instruction of a debugged process.

The integrated circuit 110 includes a data store 150 (e.g., a register) configured to store a debug world list that specifies which world identifiers supported by the integrated circuit are authorized for debugging. In some implementations, the debug world list is a bit mask with one bit for each world identifier supported by the integrated circuit. For example, the debug world list may be written to the data store 150 by the trusted core 170. For example, the debug world list may be set and locked during a boot routine.

The processor core 120 includes a debug enable circuitry 160 configured to generate a debug enable signal based on a first world identifier and the debug world list. The processor core 120 is configured to jump to debug handler instructions in response to a debug exception or ignore the debug exception depending on the debug enable signal. For example, the debug enable signal may be a high or low voltage on a conductor of the integrated circuit 110 that indicates whether a current process running on the processor core 120 is authorized to use debug handler instructions (e.g., instructions stored in the debug ROM 144). The first world identifier may be a currently applicable world identifier for the currently executing instructions in the processor core 120 that is stored in the data store 122. For example, in an active-high implementation, the debug enable signal is set high when the first world identifier is one of the world identifiers specified by the debug world list stored in the data store 150 (e.g., the bit of the debug world list corresponding to the first world identifier is high), and the debug enable signal is set low when the first world identifier is not one of the world identifiers specified by the debug world list stored in the data store 150 (e.g., the bit of the debug world list corresponding to the first world identifier is low). For example, in an active-low implementation, the debug enable signal is set low when the first world identifier is one of the world identifiers specified by the debug world list stored in the data store 150, and the debug enable signal is set high when the first world identifier is not one of the world identifiers specified by the debug world list stored in the data store 150.

The integrated circuit 110 includes a trusted core 170 that has write access to data stores (e.g., registers) storing world identifiers throughout the integrated circuit 110 that are used to tag resource requests on one or more buses of the integrated circuit 110. The trusted core 170 may also have write access to data stores in world identifier checker circuitry 142.

In some implementations (not shown in FIG. 1), the processor core 120 may be the trusted core for its integrated circuit. For example, the trusted core can simply be the processor 120 core running some trusted software in the context of a trusted world. When the world changes (e.g., from the trusted world identifier to another world identifier identifier), the processor core 120 is not considered as trusted because its state is not the trusted state.

Figure 2:
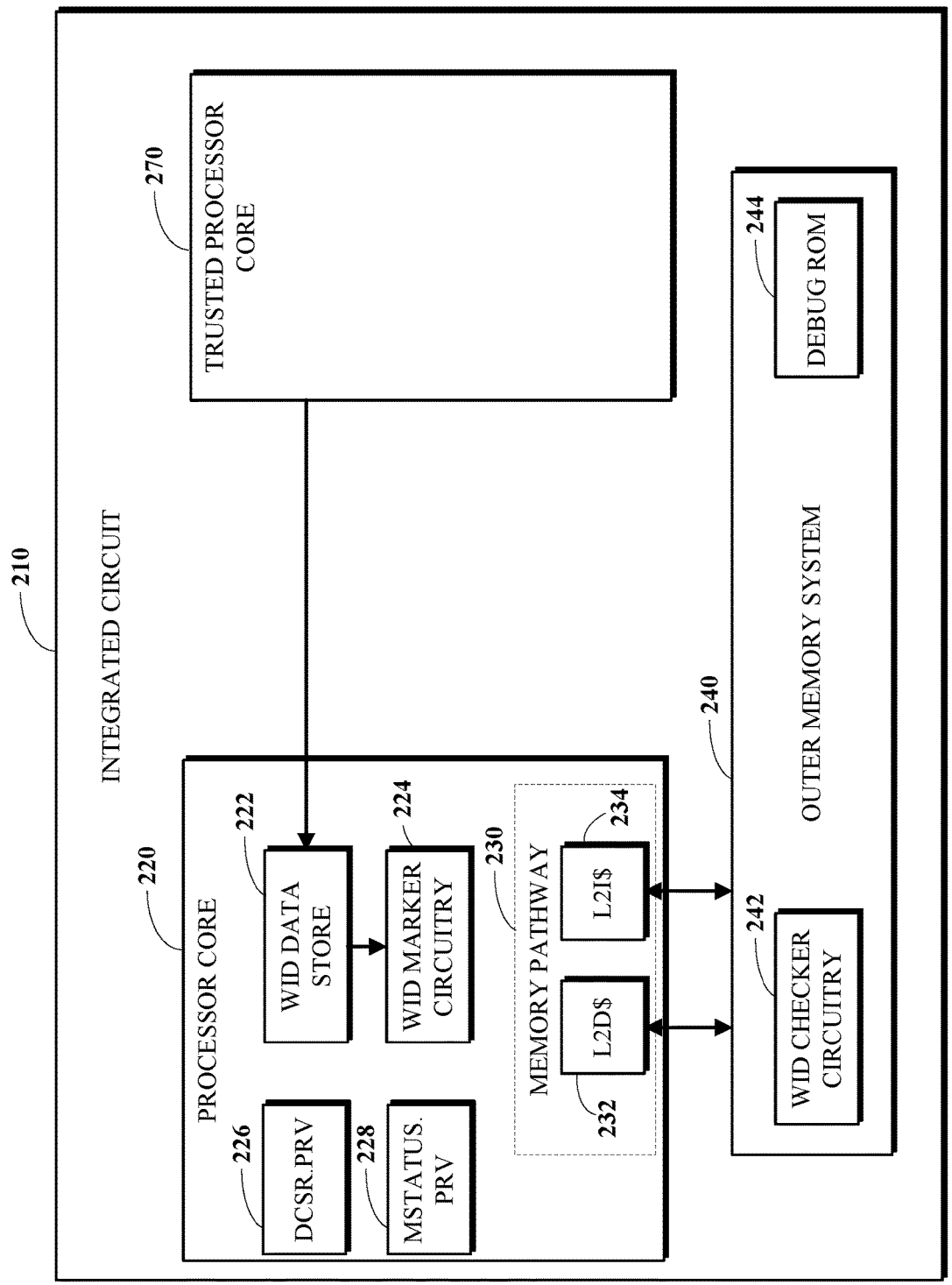
FIG. 2 is a block diagram of an example of an integrated circuit for debugging software in a system on a chip with a securely partitioned memory space.

FIG. 2 is a block diagram of an example of an integrated circuit 210 for debugging software in a system on a chip with a securely partitioned memory space. The integrated circuit 210 includes an outer memory system 240 configured to store instructions and data. The integrated circuit 210 includes a processor core 220 configured to execute instructions, including a data store 222 configured to store a first world identifier associated with a first privilege mode and a second world identifier associated with a second privilege mode. The integrated circuit 210 includes a world identifier marker circuitry 224 configured to tag memory requests transmitted by the processor core 220 on a bus of the integrated circuit 210 with a world identifier to confirm authorization to access a portion of memory space addressed by the memory requests, wherein the first world identifier is associated with a debugged process running on the processor core 220 that is being debugged, and the world identifier marker circuitry 224 is configured to use the first world identifier to tag requests on the bus generated by debug handler instructions that access resources in the memory space when the debug handler instructions are executed responsive to a debug exception caused by the debugged process. For example, the integrated circuit 210 may be used to implement the technique 800 of FIG. 8.

The integrated circuit 210 includes a processor core 220 configured to execute instructions, including a data store 222 (e.g., one or more registers) configured to store a first world identifier associated with a first privilege mode (e.g., a user mode or a supervisor mode) and a second world identifier associated with a second privilege mode (e.g., a machine mode). For example, the integrated circuit 210 may implement a SiFive WorldGuard process-driven scheme. In some implementations, the data store 222 includes a register storing the first world identifier that has a width of n bits with the number of worlds supported by the integrated being 2n=(number of masters+2). This register may be used to mark transactions going out of the master. The data store 222 may be memory mapped to enable the trusted core 270 to write to the data store 222 to assign one or more world identifiers to one or more masters of the processor core 220. In some implementations (not shown in FIG. 2), the data store 222 may be positioned outside of the processor core 220. For example, the data store 222 may be accessed by the processor core 220 via outside wires extending out of the processor core 220.

The processor core 220 includes a world identifier marker circuitry 224 configured to tag memory requests transmitted by the processor core 220 on a bus of the integrated circuit 210 with a world identifier to confirm authorization to access a portion of memory space addressed by the memory requests. For example, in the TileLink bus protocol, the userField field may be used to transmit the world identifier value with the request. For example, the world identifier marker circuitry 224 may include logic to select a world identifier associated with a privilege mode of a current process running on the processor core 220 to tag an access request for a resource (e.g., memory or a peripheral).

The processor core 220 includes a privilege bit field in a debug control and status register 226 (e.g., a dcsr.prv bit field). The privilege bit field in debug control and status register 226 is configured to store an indication of the privilege level of the processor core 220 prior to a debug exception. The processor core 220 includes a privilege bit field in a machine status register 228 (e.g., an mstatus.prv bit field). The privilege bit field in the machine status register 228 is configured to store an indication of the privilege level of the processor core 220.

The first world identifier is associated with a debugged process running on the processor core 220 that is being debugged. The world identifier marker circuitry 224 is configured to use the first world identifier to tag requests on the bus generated by debug handler instructions (e.g., stored in the debug ROM 244) that access resources in the memory space when the debug handler instructions are executed responsive to a debug exception caused by the debugged process. For example, the debug handler instructions are executed using a privilege mode (e.g., a user mode or a supervisor mode) associated with the debugged process. In some implementations, the privilege mode used by the debugged process is determined by checking the privilege level bits in the debug control and status register 226 (e.g., checking a dcsr.prv) when the debug handler instructions are executed responsive to a debug exception caused by the debugged process. For example, the privilege mode and the world identifier to use with debug handler instructions may be determined as described in relation to FIGS. 5 and 6.

The processor core 220 includes a memory pathway 230 that enables the processor core 220 to access instructions and data stored in the outer memory system 240. In this example, the memory pathway 230 includes an L1 data cache 232 and an L1 instruction cache 234 and associated memory management logic to increase the efficiency of memory operations acting on the outer memory system 240. In some implementations, the processor core 220 uses physical addresses. In some implementations, the processor core 220 uses virtual addresses and the memory pathway 230 may include one or more translation lookaside buffers (TLBs). The processor core 220 may use the memory pathway 230 to load instructions and data from the outer memory system 240. The processor core 220 may use the memory pathway 230 to store data in the outer memory system 240.

The integrated circuit 210 includes an outer memory system 240 configured to store instructions and data. The outer memory system 240 may include one or more memories. The outer memory system 240 may include one or more layers of cache. The outer memory system 240 may include memory mapped ports to one or more peripherals. The processor core 220 may be configured to (e.g., using the world identifier marker circuitry 224 and the data store 222) tag memory requests transmitted on a bus of the integrated circuit 210 by the processor core 220 with a world identifier (e.g., the first world identifier or the second world identifier) to confirm authorization to access a portion of memory space addressed by the memory requests.

The outer memory system 240 includes world identifier checker circuitry 242 for resources (e.g., portions of memory or peripherals). For example, the world identifier checker circuitry 242 for a resource may be configured to check a world identifier that has been used to tag a request on a bus for that resource against a stored world identifier or set of world identifiers for that resource. For example, a world identifier or set of world identifiers for a resource (e.g., a portion of memory or a peripheral) may be stored by the world identifier checker circuitry 242 and may be set by the trusted core 270. For example, the world identifier checker circuitry 242 may include a WorldGuard filter. For example, the world identifier checker circuitry 242 may include a WorldGuard PMP.

The outer memory system 240 includes a debug read only memory (ROM) that stores debug handler instructions that can be accessed and executed in response to a debug interrupt/exception raised by a debug instruction of a debugged process.

The integrated circuit 210 includes a trusted core 270 that has write access to data stores (e.g., registers) storing world identifiers throughout the integrated circuit 210 that are used to tag resource requests on one or more buses of the integrated circuit 210. The trusted core 270 may also have write access to data stores in world identifier checker circuitry 242.

In some implementations (not shown in FIG. 2), the processor core 220 may be the trusted core for its integrated circuit. For example, the trusted core can simply be the processor 220 core running some trusted software in the context of a trusted world. When the world changes (e.g., from the trusted world identifier to another world identifier identifier), the processor core 220 is not considered as trusted because its state is not the trusted state.

Figure 3:
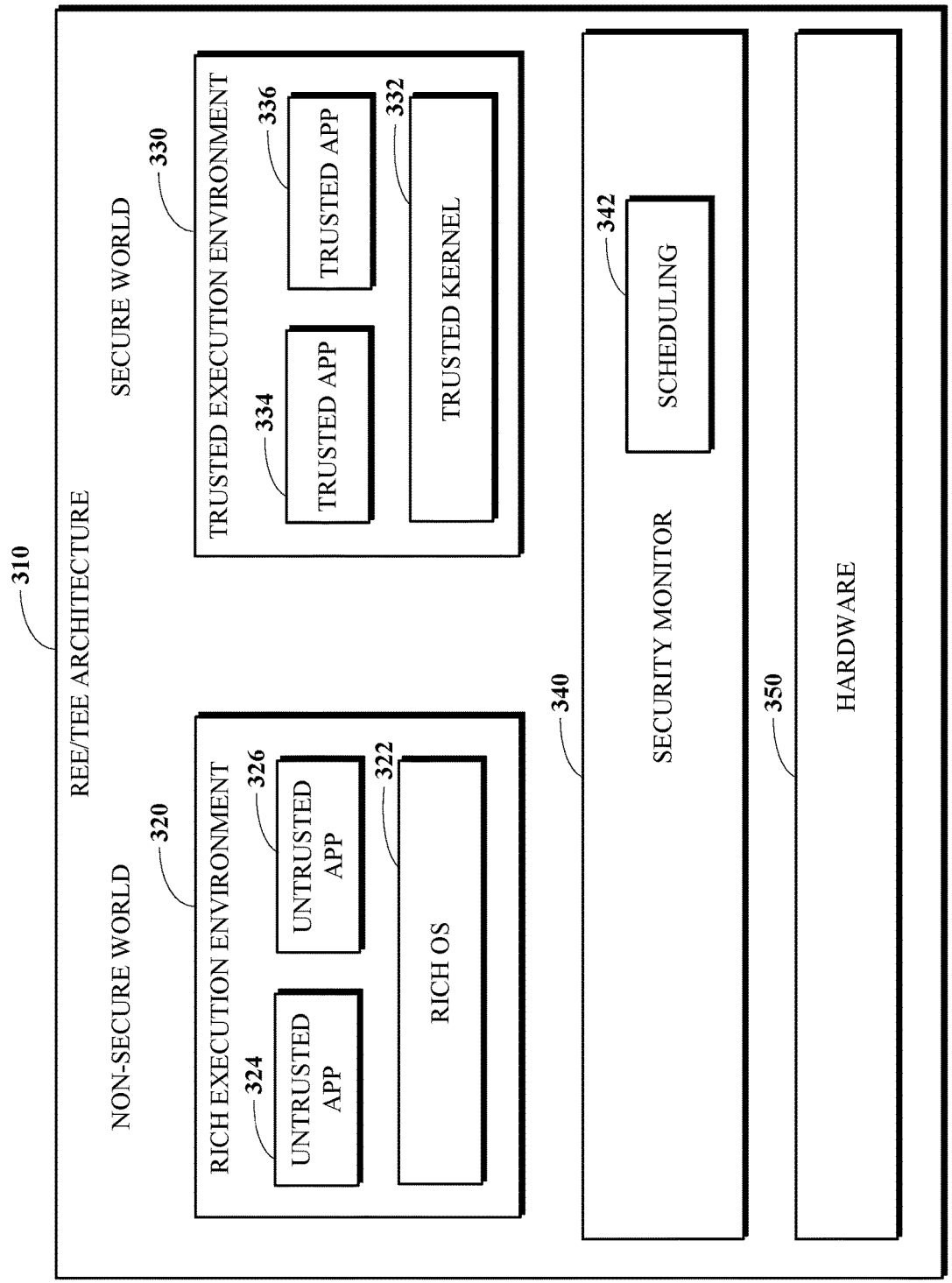
FIG. 3 is a block diagram of an example of an architecture for secure computing.

FIG. 3 is a block diagram of an example of an architecture 310 for secure computing. An example is to have a core "hosting" two worlds, the world 1 accessing the most sensitive assets (e.g. keys) and to some specific peripherals (e.g. the fingerprint reader on a smartphone), and the world 2 running generic application software. On the subordinate side, each memory or peripheral has an access control list (ACL) containing the access rights per world identifier. Through the communication bus, each marked request coming from a master is sent to a subordinate and analyzed versus its ACL. These ACL check circuits have functions very similar to the PMPs functioning with the world identifier, WID, field acting as an additional field to be checked. This mark-and-check strategy allows very complex and rich architectures to be easily secured as a wrong or missing world identifier implies the immediate rejection of the request. There is no theoretical limitation in the number of supported worlds for a specific platform, being then consistent with the software-only proposal above: the number of worlds a system on a chip (SoC) can support is application-dependent and may be determined by the application architect.

The architecture 310 includes a rich execution environment 320 that operates in a non-secure world. The rich execution environment 320 includes untrusted applications (324 and 326) that run on a rich operating system 322.

The architecture 310 includes a trusted execution environment 330 that operates in a secure world. The trusted execution environment 330 includes trusted applications (334 and 336) that run on a trusted kernel 332.

The architecture 310 includes a security monitor 340. The security monitor 340 is in charge of switches management between secure and non-secure states. The security monitor 340 may manage the context switches (e.g., save and restore). The security monitor 340 is also in charge of interrupts handling. The security monitor 340 includes a scheduling module 342. The architecture 310 includes hardware 350 which may be a single processor core or multiple processor cores.

For example, the untrusted applications (324 and 326) and the rich operating system 322 may be associated with a first world identifier that their resource (e.g., memory or peripheral) access requests are tagged with. For example, the trusted applications (334 and 336) and the trusted kernel 332 may be associated with a second world identifier that their resource (e.g., memory or peripheral) access requests are tagged with.

Figure 4:
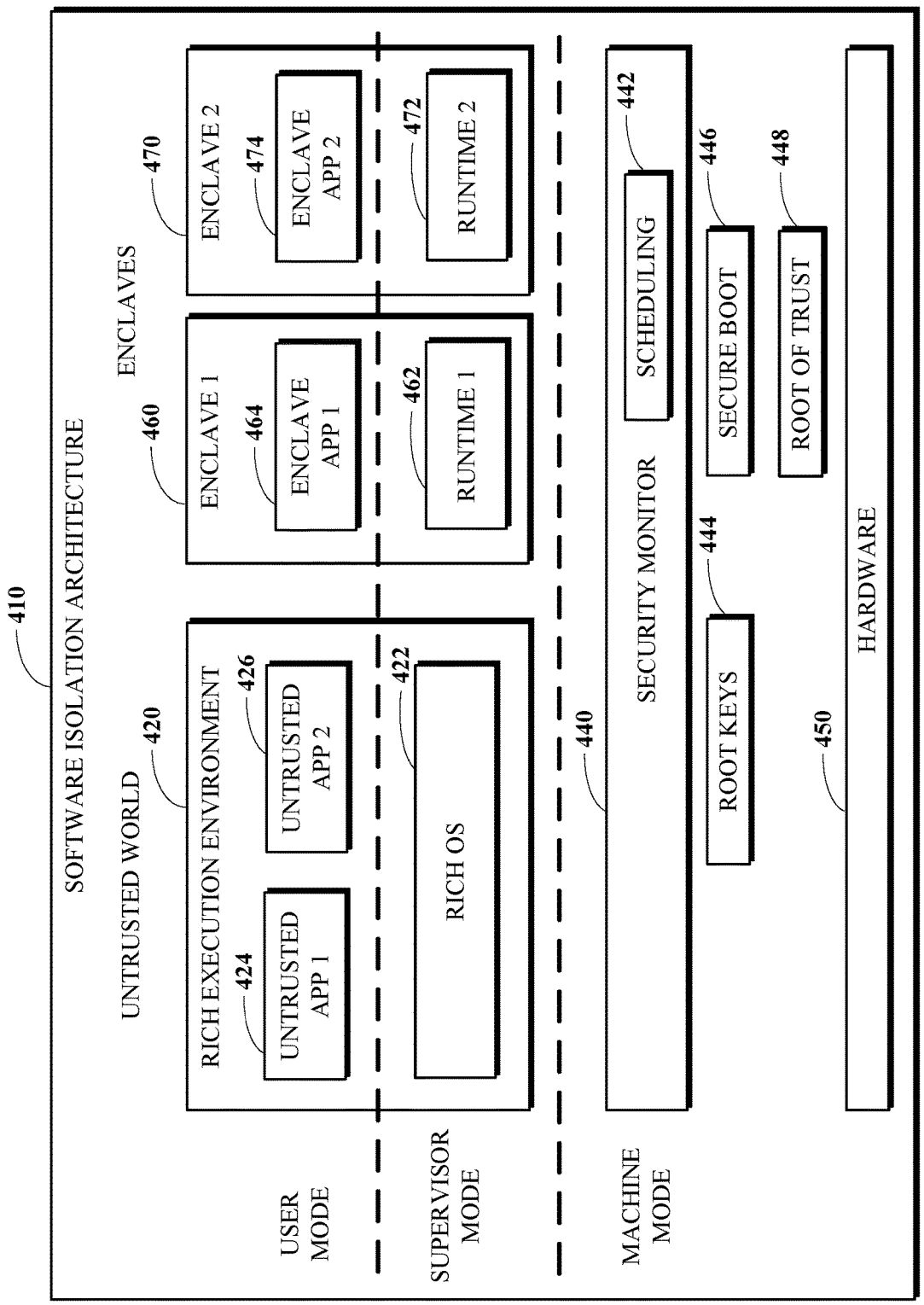
FIG. 4 is a block diagram of an example of an architecture for software isolation on a single core.

FIG. 4 is a block diagram of an example of an architecture 410 for software isolation on a single core. The architecture 410 includes a rich execution environment 420 running in an untrusted world. The rich execution environment 420 includes untrusted applications (424 and 426) running on a rich operating system 422.

The architecture 410 includes a security monitor 440. The security monitor 440 includes a scheduling module 442. The architecture 410 includes root keys 444, a secure boot module 446, and a root of trust 448. The architecture 410 includes hardware 450 which, in this example, is a single processor core.

The architecture 410 includes a first enclave 460 that includes an enclave application 464 running on a runtime operating system 462. The architecture 410 includes a second enclave 470 that includes an enclave application 474 running on a runtime operating system 472.

The untrusted applications (424 and 426) and the enclave applications (464 and 474) may use the privilege mode of user mode. The rich operating system 422 and the runtime operating systems (462 and 472) may use the privilege mode of supervisor mode. The security monitor 440, the root keys 444, the secure boot module 446, and the root of trust 448 may use the privilege mode of machine mode.

In some implementations, the untrusted applications (424 and 426) and the rich operating system 422 use a shared world identifier. For example, the security monitor 440, the root keys 444, the secure boot module 446, and the root of trust 448 may all use a common trusted world identifier. For example, the enclave applications (464 and 474) and the runtime operating systems (462 and 472) may each have their own unique world identifiers.

Examples of architectures are described in FIG. 3 (REE/TEE architecture) and FIG. 4 (Keystone enclave solution). This approach is based on a secure monitor, able to manage the different independent pieces of software. These pieces can be named boxes, containers, or blocks but the idea is to have them not managing the privilege modes, as this function is only available to the security monitor 440. The boxes resources (memories, peripherals) and Inter-boxes communications are also dynamically controlled and allocated by the hypervisor, upon request from the boxes.

On very flexible platforms, such as RISC-V-based products, it may be advantageous to attribute any important function or task to only one single container, separated from the others: one container for the cryptographic, another one for the communication library, one for the data sensors, one for the main application. An example of a software architecture would be to have the secure monitor running in machine mode (M-mode), controlling containers. Each of the containers could be made of two parts, one, the operating system, running in supervisor mode (S-mode) and the application task, running in user mode (U-mode).

The debug mechanisms may be adapted to conform to the WorldGuard principles and the platform configuration. If required, the debug shall be prevented for certain worlds, for their software and their resources (e.g., memories and peripherals). This scenario is typical of a software architecture where some portions of the code, for example the TEE or the secure enclave, are not accessible to the application developer and so shall not be available to the debug module while the application that is currently developed shall be available to the debug module.

For example, a world associated with a rich execution environment may be available for application debugging while the other worlds (security monitor, enclaves) may not.

For example, consider a WorldGuard platform with a maximum number of NWorlds worlds. A debugwid-list list may be set that is made of NWorlds bits, each bit representing a WID value (among all the possible worlds values) and the ability for the debug module to perform debugging operations for this WID value (i.e., debugging software running on the core with this current WID value). Therefore, a combinatorial function of wgMarker WID value and the debugwid-list information generates a final debug-wg-authorized signal. This signal may then be combined with other signals that prevent debug for non-authorized WIDs. This signal is used to allow or prevent the debug interrupt to be taken and to jump to the debug handler in debug ROM. In some implementations, the debug interrupt signal itself still reaches the core but the debug-wg-authorized signal decides whether to take the interrupt or ignore it. As a result, the debug ROM code is not used when the WID debug is not authorized.

Assuming now the debug is authorized and so, the debug interrupt has been taken, the debug operations may be to access some CSRs and/or some data in the memory. Therefore, care may be taken to validate the access of these CSRs with the current WID value. Similarly, the data access may be granted according to the data address consistency with the current WID value. However, as the debug ROM code runs in debug mode which grants any access, the privileged mode used for the access control shall come from the dcsr.prv instead of the mstatus.prv. This rule may imply some modifications and some consequences. For example, one modification is that the hardware logic in the CSR module of the processor core may be modified to check dcsr.prv instead of mstatus.prv against the CSR number, if the mstatus.prv is the debug mode.

Figure 5:
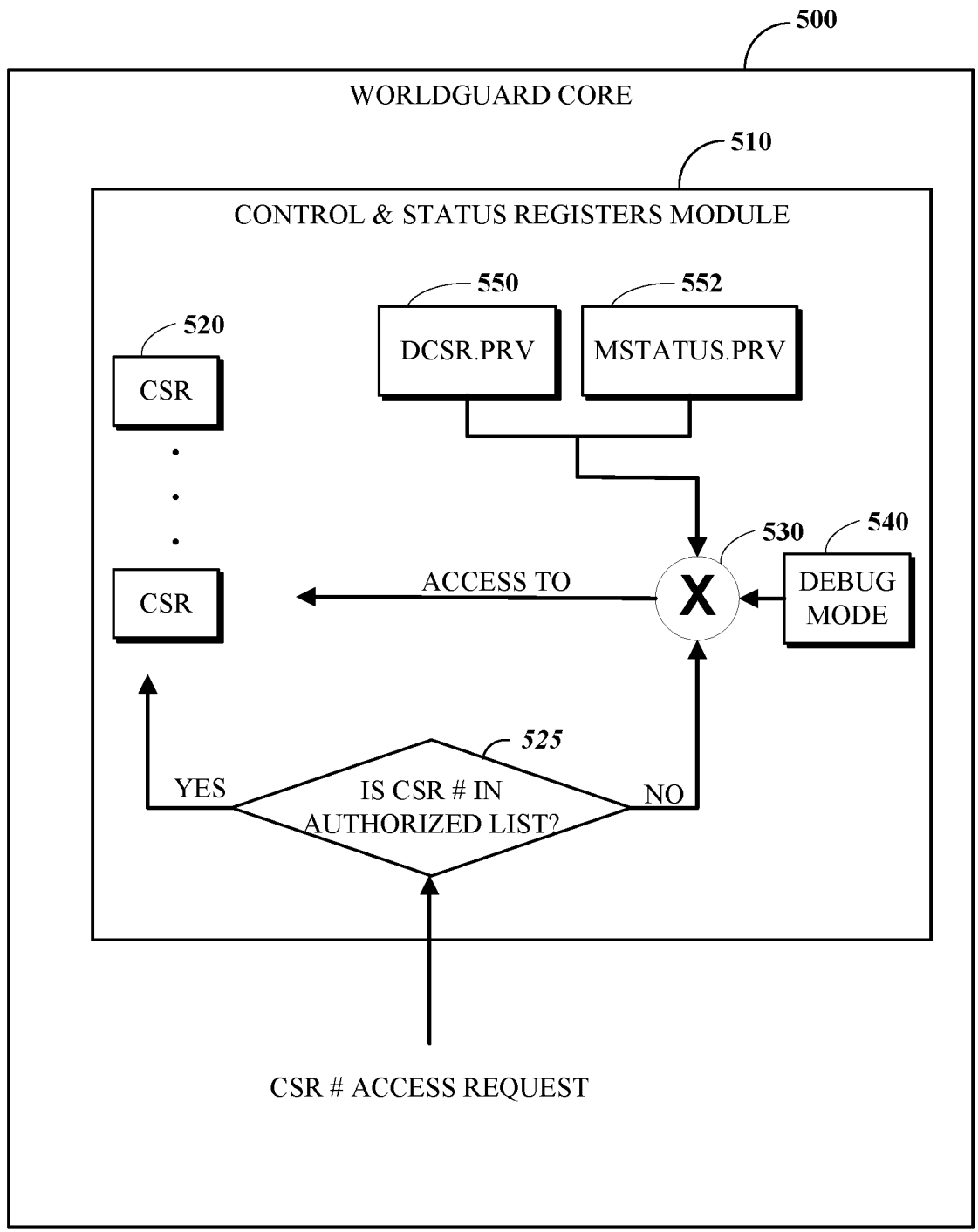
FIG. 5 is a block diagram of an example of processor core enabled for debug with hardware enforced software isolation.

FIG. 5 is a block diagram of an example of a processor core 500 enabled for debug with hardware enforced software isolation. The processor core 500 includes a control and status registers module 510. The control and status registers module 510 includes a set of control and status registers 520. The control and status registers module 510 includes circuitry 525 to control access to the set of control and status registers 520 base on an authorized list. For example, some CSRs may be accessible to all processes, and the circuitry 525 may grant access to these CSRs in response to a request. For example, some CSRs may be accessible to some, but not all processes, and the circuitry 525 may use the multiplexer 530 with the debug mode signal 540 as a selector input to selectively choose between the privilege bits of the debug control and status register 550 (e.g., dcsr.prv) and the privilege bits of the machine status register 552 (e.g., mstatus.prv). When the debug mode signal 540 is active, then the privilege bits of the debug control and status register 550 may be checked to determine the privilege mode of a process being debugged and determine whether to grant access to a requested CSR based on the this privilege mode. When the debug mode signal 540 is in-active, then the privilege bits of the machine status register 552 may be checked to determine the privilege mode of a process currently running and determine whether to grant access to a requested CSR in the set of control and status registers 520 based on this privilege mode.

For example, the processor core 500 may cause an illegal exception when the CSR access is not allowed for this privileged mode. When this exception is taken, the Debug ROM handles it as usual and reports the exception result back to the debugger. A consequence is that a CSR access attempt may be performed using the dcsr.prv and so, with the rights related to this privileged mode (and not the rights of the debug mode). However, an exception to that rule shall be considered for some specific CSRs that shall be accessible from the debug ROM code anyway: the debug core CSRs (e.g., dcsr!), but also others in M-mode, e.g., the misa and the triggers CSRs. There may then be a list of authorized CSRs, whatever the dcsr.prv mode.

Figure 6:
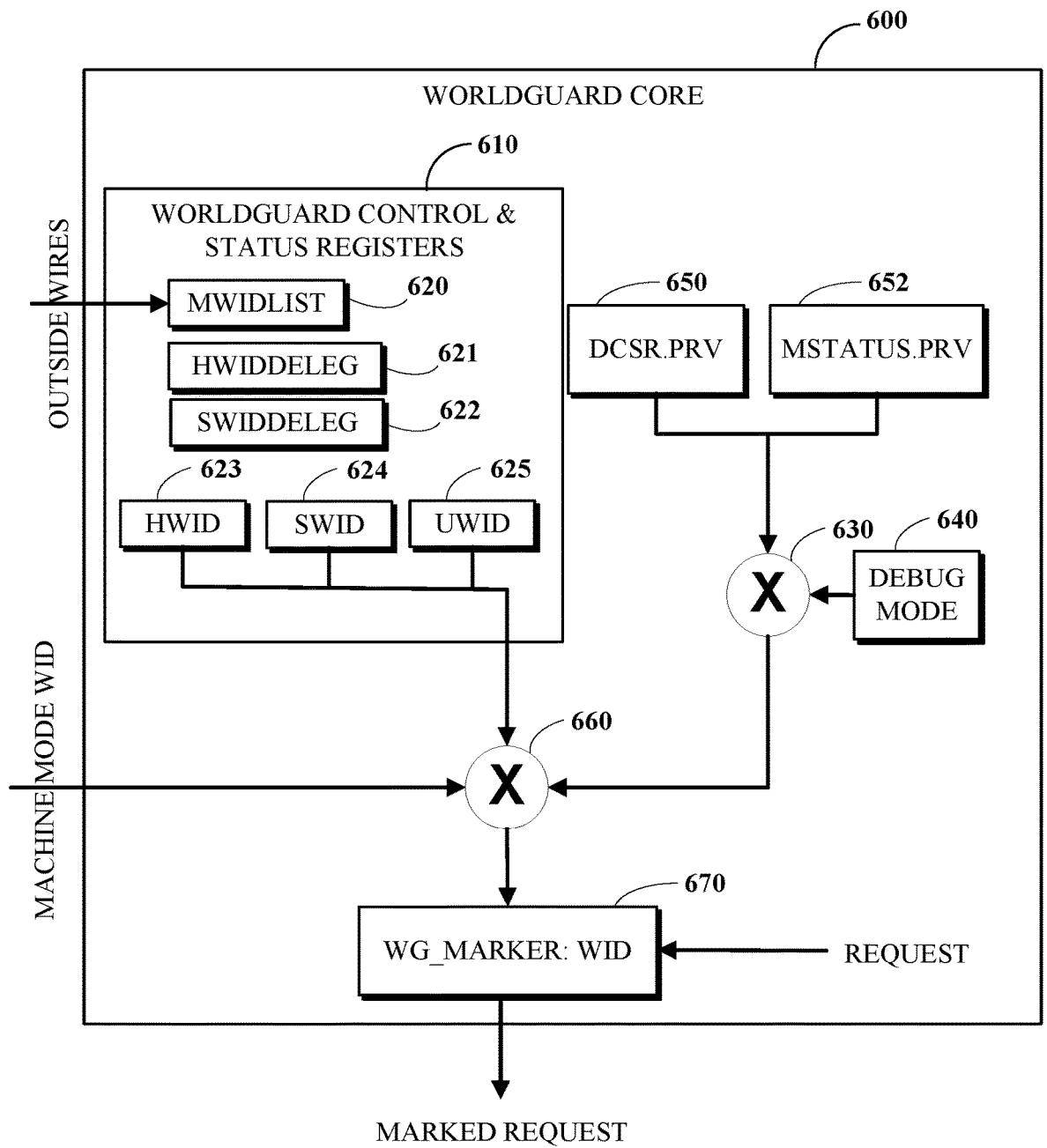
FIG. 6 is a block diagram of an example of processor core enabled for debug with hardware enforced software isolation.

FIG. 6 is a block diagram of an example of processor core 600 enabled for debug with hardware enforced software isolation. The processor core 600 includes a set of WorldGuard control and status registers 610. The set of WorldGuard control and status registers 610 includes a list of world identifiers 620 that a machine mode master outside of the processor core 600 make available for use to lower privilege mode (e.g., hypervisor mode, supervisor mode, or user mode) processes running on the processor core 600. The list of world identifiers 620 is written by a set of outside wires and is read only within the processor core 600. The set of WorldGuard control and status registers 610 includes a list of world identifiers 621 delegated by a hypervisor mode master within the processor core 600 to lower priority mode masters (e.g., supervisor mode or user mode), and a list of world identifiers 622 delegated by a supervisor mode master within the processor core 600 to lower priority mode masters (e.g., user mode). The set of WorldGuard control and status registers 610 includes a world identifier 623 that is used by a hypervisor mode master and has been configured by a machine mode master; a world identifier 624 that is used by a supervisor mode master and has been configured by a hypervisor mode master; and a world identifier 625 that is used by a user mode master and has been configured by a supervisor mode master.

The processor core 600 includes a multiplexer 630 for selecting based on a debug mode signal 640 as a selector input to selectively choose between the privilege bits of the debug control and status register 650 (e.g., dcsr.prv) and the privilege bits of the machine status register 652 (e.g., mstatus.prv). When the debug mode signal 640 is active, then the privilege bits of the debug control and status register 650 may be used as a selector input for a multiplexer 660 that is used to select world identifier for use from among a world identifier for a machine mode master that comes to the multiplexer 660 via outside wires; the world identifier 623 for a hypervisor mode master; the world identifier 624 for a supervisor mode master; and the world identifier 625 for a user mode master. When the debug mode signal 640 is inactive, then the privilege bits of the machine status register 652 may be used as a selector input for a multiplexer 660. The selected world identifier that is output from the multiplexer 660 is input to a WorldGuard marker circuitry 670 that is configured to apply the selected world identifier to request for access to a resource (e.g., a memory or a peripheral) to output a marker request.

Similarly, using the dcsr.prv for determining the world identifier (WID) value implies that a marked request outgoing from the core may be marked with the current WID value, even when the privileged mode mstatus.prv is the debug mode. For example, the WID access rules may be enforced at the wgChecker side and any request from the core, even in debug conditions may be processed the same way as generic application software requests.

Figure 7:
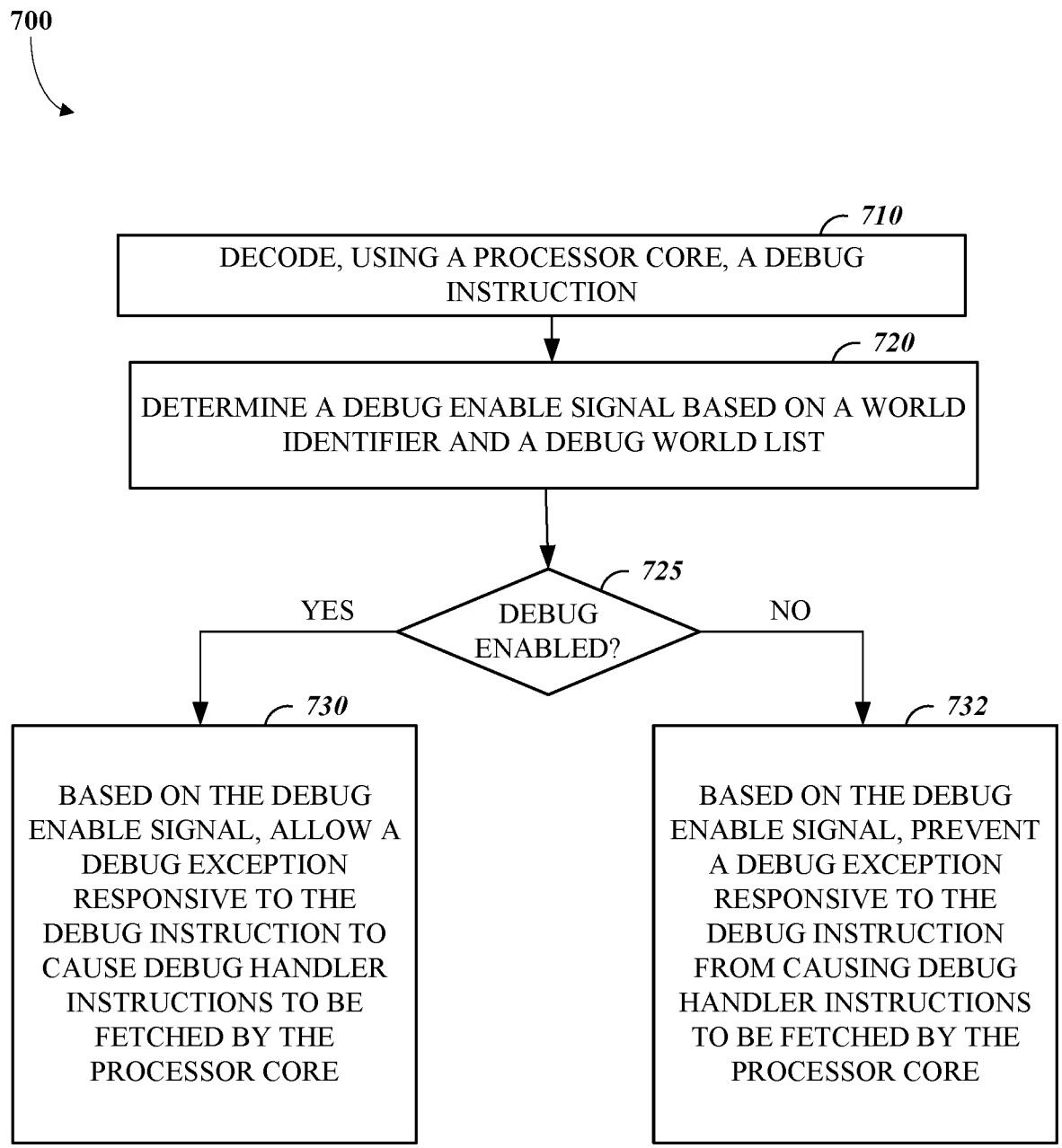
FIG. 7 is a flow chart of an example of a technique for enabling debug in a system on a chip with a securely partitioned memory space.

FIG. 7 is a flow chart of an example of a technique 700 for enabling debug in a system on a chip with a securely partitioned memory space. The technique 700 includes decoding 710, using a processor core, a first debug instruction. The technique 700 includes determining 720 a debug enable signal based on a first world identifier associated with the processor core and based on a debug world list that specifies which world identifiers supported by the integrated circuit are authorized for debugging. At 725, if debug is enabled, the technique 700 includes, based on the debug enable signal, allowing 730 a debug exception responsive to the first debug instruction to cause debug handler instructions to be fetched by the processor core. At 725, if debug is not enabled, the technique 700 includes, based on the debug enable signal, preventing 732 a debug exception responsive to the debug instruction from causing debug handler instructions to be fetched by the processor core. For example, the technique 700 may be implemented using the integrated circuit 110 of FIG. 1.

The technique 700 includes decoding 710, using a first processor core (e.g., the processor core 120), a first debug instruction (e.g., a breakpoint). For example, the first debug instruction may be part of a debugged process that runs with a low priority (e.g., a user mode or a supervisor mode). The process executing on the first processor core may be associated with a first world identifier. In some implementations, the first world identifier is associated with processes running on the processor core with the privilege mode of the debugged process. In some implementations, the first world identifier is associated with all processes running on the first processor core. For example, the first world identifier may be associated with all processes executed by the first processor core. The first processor core may be configured to tag memory requests transmitted on a bus of an integrated circuit by the first processor core with the first world identifier to confirm authorization to access a portion of memory space (e.g., a portion of memory or a peripheral) addressed by the memory request.

For example, the first world identifier may be one of multiple world identifiers stored in the first processor core that are each associated with different privilege modes. The technique 700 may include tagging, using the first processor core, requests on a bus generated by debug handler instructions (e.g., stored in the debug ROM 144) that access resources in a memory space with the first world identifier when the debug handler instructions are executed responsive to a debug exception caused by the debugged process. For example, the technique 800 of FIG. 8 may be implemented along with the technique 700. For example, debug handler instructions may be executed using a privilege mode associated with the debugged process. In some implementations, the privilege mode used by the debugged process is determined by checking privilege level bits in a debug control and status register when the debug handler instructions are executed responsive to a debug exception caused by the debugged process. For example, the privilege mode and the world identifier to use with debug handler instructions may be determined as described in relation to FIGS. 5 and 6.

The technique 700 includes determining 720 a first debug enable signal based on a first world identifier associated with the first processor core and based on a debug world list. The debug world list specifies which world identifiers supported by the integrated circuit are authorized for debugging. For example, a first debug enable signal may be a voltage (e.g., active-high or active-low) on a conductor of the integrated circuit. In some implementations, the first debug enable signal is determined 720 using logic circuitry. For example, the debug enable signal may be determined 720 continuously based on current values of the debug world list and the first world identifier. For example, the debug world list may be a bit mask with one bit for each world identifier supported by the integrated circuit. In some implementations, the debug world list is set and locked during a boot routine. For example, the debug world list may be written by a trusted core (e.g., the trusted core 170).

At 725, if debug is enabled, the technique 700 includes, based on the first debug enable signal, allowing 730 a debug exception responsive to the first debug instruction to cause debug handler instructions (e.g., stored in the debug ROM 144) to be fetched by the first processor core.

At 725, if debug is not enabled, the technique 700 includes, based on the debug enable signal, preventing 732 a debug exception responsive to the debug instruction from causing debug handler instructions to be fetched by the processor core. In some implementations, preventing 732 a debug exception responsive to the debug instruction from causing debug handler instructions to be fetched by the processor core includes preventing 732 a jump to debug handler instructions responsive to a debug instruction. In some implementations, preventing 732 a debug exception responsive to the debug instruction from causing debug handler instructions to be fetched by the processor core includes preventing 732 the debug exception from occurring.

For example, the technique 700 may be repeated for additional debug instructions that are decoded as part of the debugged process and/or other debugged processes. For example, the technique 700 may include decoding 710, using a second processor core, a second debug instruction; determining 720 a second debug enable signal based on a second world identifier associated with the second processor core and based on the debug world list; and, based on the second debug enable signal, preventing 732 a debug exception responsive to the second debug instruction from causing debug handler instructions to be fetched by the second processor core. The second processor core may be configured to tag memory requests transmitted on a bus of the integrated circuit by the second processor core with the second world identifier to confirm authorization to access a portion of memory space addressed by the memory request.

Figure 8:
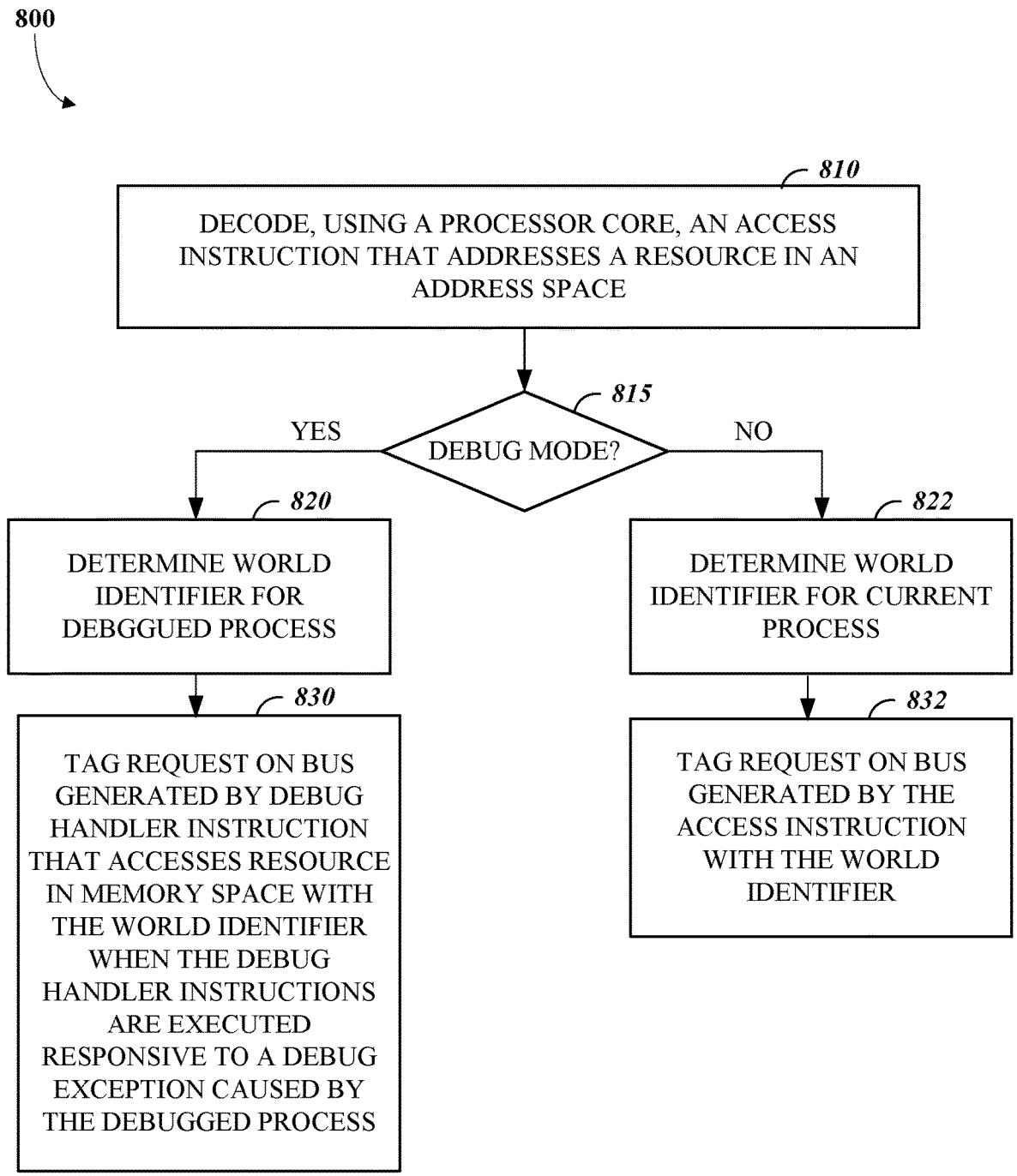
FIG. 8 is a flow chart of an example of a technique for controlling access to resources during debug in a system on a chip with a securely partitioned memory space.

FIG. 8 is a flow chart of an example of a technique 800 for controlling access to resources during debug in a system on a chip with a securely partitioned memory space. The technique 800 includes decoding 810, using a processor core, an access instruction that addresses a resource in an address space. At 815, if the processor core is operating in debug mode, then the technique 800 includes determining 820 a world identifier for the debugged process that is being debugged; and tagging 830, using the processor core, requests on a bus generated by debug handler instructions that access resources in a memory space with the first world identifier when the debug handler instructions are executed responsive to a debug exception caused by the debugged process. At 815, if the processor core is not operating in debug mode, then the technique 800 includes determining 822 a world identifier for the currently executing process; and tagging 832, using the processor core, requests on a bus generated by the access instruction with the world identifier.

The technique 800 includes decoding 810, using a first processor core (e.g., the processor core 120), an access instruction that addresses a resource (e.g., a portion of memory or a peripheral) in an address space. For example, the access instruction may be part of a debugged process that runs with a low priority (e.g., a user mode or a supervisor mode). The process executing on the first processor core may be associated with a first world identifier. In some implementations, the first world identifier is associated with processes running on the processor core with the privilege mode of the debugged process. In some implementations, the first world identifier is associated with all processes running on the first processor core. For example, the first world identifier may be associated with all processes executed by the first processor core. The first processor core may be configured to tag memory requests transmitted on a bus of an integrated circuit by the first processor core with the first world identifier to confirm authorization to access a portion of memory space (e.g., a portion of memory or a peripheral) addressed by the memory request.

The privilege mode used by the debugged process may be determined by checking privilege level bits in a debug control and status register when the debug handler instructions are executed responsive to a debug exception caused by the debugged process. For example, the privilege mode used by the debugged process may be determined by checking a dcsr.prv register when the debug handler instructions are executed responsive to a debug exception caused by the debugged process.

At 815, if the processor core is operating in debug mode, then the technique 800 includes determining 820 a world identifier for the debugged process that is being debugged; and tagging 830 memory requests transmitted by the processor core on a bus of the integrated circuit with the world identifier to confirm authorization to access a portion of memory space addressed by the memory requests. For example, world identifier marker circuitry may use the first world identifier to tag requests on the bus generated by debug handler instructions (e.g., stored in the debug ROM 144) that access resources in the memory space when the debug handler instructions are executed responsive to a debug exception caused by the debugged process. For example, the debug handler instructions may be executed using a privilege mode associated with the debugged process.

At 815, if the processor core is not operating in debug mode, then the technique 800 includes determining 822 a world identifier for the currently executing process; and tagging 832, using the processor core, requests on a bus generated by the access instruction with the world identifier.

In a first aspect, the subject matter described in this specification can be embodied in an integrated circuit for executing instructions that includes: a processor core configured to execute instructions, including a data store configured to store a first world identifier; an outer memory system configured to store instructions and data, wherein the processor core is configured to tag memory requests transmitted on a bus of the integrated circuit by the processor core with the first world identifier to confirm authorization to access a portion of memory space addressed by the memory requests; a data store configured to store a debug world list that specifies which world identifiers supported by the integrated circuit are authorized for debugging; and a debug enable circuitry configured to generate a debug enable signal based on the first world identifier and the debug world list, wherein the processor core is configured to jump to debug handler instructions in response a debug exception or ignore the debug exception depending on the debug enable signal. For example, the debug world list may be a bit mask with one bit for each world identifier supported by the integrated circuit. In some implementations, the debug world list is set and locked during a boot routine. For example, the first world identifier may be associated with all processes executed by the processor core. For example, the first world identifier is one of multiple world identifiers stored in the processor core that are each associated with different privilege modes. In some implementations, first world identifier is associated with a debugged process running on the processor core that is being debugged, and the processor core is configured to use the first world identifier to tag request on a bus generated by debug handler instructions that access resources in a memory space when the debug handler instructions are executed responsive to a debug exception caused by the debugged process. For example, debug handler instructions may be executed using a privilege mode associated with the debugged process. In some implementations, the privilege mode used by the debugged process is determined by checking privilege level bits in a debug control and status register when the debug handler instructions are executed responsive to a debug exception caused by the debugged process.

In a second aspect, the subject matter described in this specification can be embodied in methods that include decoding, using a first processor core, a first debug instruction; determining a first debug enable signal based on a first world identifier associated with the first processor core and based on a debug world list, wherein the first processor core is configured to tag memory requests transmitted on a bus of an integrated circuit by the first processor core with the first world identifier to confirm authorization to access a portion of memory space addressed by the memory request, and wherein the debug world list specifies which world identifiers supported by the integrated circuit are authorized for debugging; and, based on the first debug enable signal, allowing a debug exception responsive to the first debug instruction to cause debug handler instructions to be fetched by the first processor core. The second aspect may include decoding, using a second processor core, a second debug instruction; determining a second debug enable signal based on a second world identifier associated with the second processor core and based on the debug world list, wherein the second processor core is configured to tag memory requests transmitted on a bus of the integrated circuit by the second processor core with the second world identifier to confirm authorization to access a portion of memory space addressed by the memory request; and, based on the second debug enable signal, preventing a debug exception responsive to the second debug instruction from causing debug handler instructions to be fetched by the second processor core. For example, the debug world list may be a bit mask with one bit for each world identifier supported by the integrated circuit. In some implementations, the debug world list is set and locked during a boot routine. For example, the first world identifier may be associated with all processes executed by the first processor core. For example, the first world identifier may be one of multiple world identifiers stored in the first processor core that are each associated with different privilege modes. In some implementations, the first world identifier is associated with a debugged process running on the first processor core that is being debugged, and the second aspect includes tagging, using the first processor core, requests on a bus generated by debug handler instructions that access resources in a memory space with the first world identifier when the debug handler instructions are executed responsive to a debug exception caused by the debugged process. For example, debug handler instructions may be executed using a privilege mode associated with the debugged process. In some implementations, the privilege mode used by the debugged process is determined by checking privilege level bits in a debug control and status register when the debug handler instructions are executed responsive to a debug exception caused by the debugged process.

In a third aspect, the subject matter described in this specification can be embodied in an integrated circuit for executing instructions that includes: an outer memory system configured to store instructions and data; a processor core configured to execute instructions, including a data store configured to store a first world identifier associated with a first privilege mode and a second world identifier associated with a second privilege mode; and a world identifier marker circuitry configured to tag memory requests transmitted by the processor core on a bus of the integrated circuit with a world identifier to confirm authorization to access a portion of memory space addressed by the memory requests, wherein the first world identifier is associated with a debugged process running on the processor core that is being debugged, and the world identifier marker circuitry is configured to use the first world identifier to tag requests on the bus generated by debug handler instructions that access resources in the memory space when the debug handler instructions are executed responsive to a debug exception caused by the debugged process. For example, debug handler instructions may be executed using a privilege mode associated with the debugged process. In some implementations, the privilege mode used by the debugged process is determined by checking a privilege level bits in a debug control and status register when the debug handler instructions are executed responsive to a debug exception caused by the debugged process.

In a fourth aspect, the subject matter described in this specification can be embodied in methods that include decoding, using a processor core, an access instruction that addresses a resource in an address space; determining a world identifier for the debugged process that is being debugged; and tagging, using the processor core, requests on a bus generated by debug handler instructions that access resources in a memory space with the first world identifier when the debug handler instructions are executed responsive to a debug exception caused by the debugged process. For example, debug handler instructions may be executed using a privilege mode associated with the debugged process. In some implementations, the privilege mode used by the debugged process is determined by checking privilege level bits in a debug control and status register when the debug handler instructions are executed responsive to a debug exception caused by the debugged process.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:
   a processor core configured to execute instructions;
   a data store configured to store a first world identifier, wherein the processor core is configured to tag memory requests transmitted on a bus of the integrated circuit by the processor core with the first world identifier to confirm authorization to access a portion of memory space addressed by the memory requests;
   a data store configured to store a debug world list that specifies which world identifiers supported by the integrated circuit are authorized for debugging; and
   a debug enable circuitry configured to generate a debug enable signal based on the first world identifier and the debug world list, wherein the processor core is configured to jump to debug handler instructions in response to a debug exception or ignore the debug exception depending on the debug enable signal.

2. The integrated circuit of claim 1, in which the debug world list is a bit mask with one bit for each world identifier supported by the integrated circuit.

3. The integrated circuit of claim 1, in which the debug world list is set and locked during a boot routine.

4. The integrated circuit of claim 1, in which the first world identifier is associated with all processes executed by the processor core.

5. The integrated circuit of claim 1, in which the first world identifier is one of multiple world identifiers stored in the processor core that are each associated with different privilege modes.

6. The integrated circuit of claim 1, in which the first world identifier is associated with a debugged process running on the processor core that is being debugged, and the processor core is configured to use the first world identifier to tag request on a bus generated by debug handler instructions that access resources in a memory space when the debug handler instructions are executed responsive to a debug exception caused by the debugged process.

7. The integrated circuit of claim 6, in which the debug handler instructions are executed using a privilege mode associated with the debugged process.

8. The integrated circuit of claim 7, in which the privilege mode used by the debugged process is determined by checking privilege level bits in a debug control and status register when the debug handler instructions are executed responsive to a debug exception caused by the debugged process.

9. A method comprising:
   decoding, using a first processor core, a first debug instruction;
   determining a first debug enable signal based on a first world identifier associated with the first processor core and based on a debug world list, wherein the first processor core is configured to tag memory requests transmitted on a bus of an integrated circuit by the first processor core with the first world identifier to confirm authorization to access a portion of memory space addressed by the memory requests, and wherein the debug world list specifies which world identifiers supported by the integrated circuit are authorized for debugging; and
   based on the first debug enable signal, allowing a debug exception responsive to the first debug instruction to cause debug handler instructions to be fetched by the first processor core.

10. The method of claim 9, comprising:
    decoding, using a second processor core, a second debug instruction;
    determining a second debug enable signal based on a second world identifier associated with the second processor core and based on the debug world list, wherein the second processor core is configured to tag second memory requests transmitted on a bus of the integrated circuit by the second processor core with the second world identifier to confirm authorization to access a second portion of memory space addressed by the second memory requests; and
    based on the second debug enable signal, preventing a debug exception responsive to the second debug instruction from causing debug handler instructions to be fetched by the second processor core.

11. The method of claim 9, in which the debug world list is a bit mask with one bit for each world identifier supported by the integrated circuit.

12. The method of claim 9, in which the debug world list is set and locked during a boot routine.

13. The method of claim 9, in which the first world identifier is associated with all processes executed by the first processor core.

14. The method of claim 9, in which the first world identifier is one of multiple world identifiers stored in the first processor core that are each associated with different privilege modes.

15. The method of claim 9, in which the first world identifier is associated with a debugged process running on the first processor core that is being debugged, further comprising:
    tagging, using the first processor core, requests on a bus generated by debug handler instructions that access resources in a memory space with the first world identifier when the debug handler instructions are executed responsive to a debug exception caused by the debugged process.

16. The method of claim 15, in which debug handler instructions are executed using a privilege mode associated with the debugged process.

17. The method of claim 16, in which the privilege mode used by the debugged process is determined by checking privilege level bits in a debug control and status register when the debug handler instructions are executed responsive to a debug exception caused by the debugged process.

18. An integrated circuit for executing instructions comprising:
    a processor core configured to execute instructions;
    a data store configured to store a first world identifier associated with a first privilege mode and a second world identifier associated with a second privilege mode; and
    a world identifier marker circuitry configured to tag memory requests transmitted by the processor core on a bus of the integrated circuit with a world identifier to confirm authorization to access a portion of memory space addressed by the memory requests, wherein the first world identifier is associated with a debugged process running on the processor core that is being debugged, and the world identifier marker circuitry is configured to use the first world identifier to tag requests on the bus generated by debug handler instructions that access resources in the memory space when the debug handler instructions are executed responsive to a debug exception caused by the debugged process.

19. The integrated circuit of claim 18, in which debug handler instructions are executed using a privilege mode associated with the debugged process.

20. The integrated circuit of claim 19, in which the privilege mode used by the debugged process is determined by checking privilege level bits in a debug control and status register when the debug handler instructions are executed responsive to the debug exception caused by the debugged process.

* * * * *